United States Patent [19]

Hammer

[11] Patent Number: 4,499,923
[45] Date of Patent: Feb. 19, 1985

[54] CONCRETE PIPE WITH AN INNER LINING

[75] Inventor: Heiner I. Hammer, Seevetal, Fed. Rep. of Germany

[73] Assignee: Schlegel Lining Technology GmbH, Hamburg, Fed. Rep. of Germany

[21] Appl. No.: 592,217

[22] Filed: Mar. 22, 1984

Related U.S. Application Data

[63] Continuation of Ser. No. 362,077, Mar. 26, 1982, abandoned.

[30] Foreign Application Priority Data

Apr. 7, 1981 [DE] Fed. Rep. of Germany ....... 3114003

[51] Int. Cl.$^3$ ............................................. F46L 9/08
[52] U.S. Cl. ................................... 138/109; 138/141; 138/144
[58] Field of Search ..................... 52/309.17, 445, 446; 138/109, 141, 142, 144, 147, 155, 175; 285/55; 428/86

[56] References Cited

U.S. PATENT DOCUMENTS

| | | | |
|---|---|---|---|
| 868,785 | 10/1907 | Johnson | 138/175 X |
| 1,152,860 | 9/1915 | Stoetzer | 52/445 X |
| 2,925,831 | 2/1960 | Welty et al. | 52/309.17 X |
| 3,742,985 | 7/1973 | Rubenstein | 138/141 |
| 3,868,296 | 2/1975 | McKeon, Jr. et al. | 52/309.17 X |
| 4,241,762 | 12/1980 | Link et al. | 138/155 X |
| 4,242,406 | 12/1980 | El Bouhnini et al. | 56/612 X |

FOREIGN PATENT DOCUMENTS

| | | | |
|---|---|---|---|
| 2317041 | 10/1974 | Fed. Rep. of Germany | 138/175 |
| 2432648 | 1/1976 | Fed. Rep. of Germany | 138/141 |
| 2649957 | 5/1978 | Fed. Rep. of Germany | 52/309.17 |
| 1269338 | 4/1972 | United Kingdom | 428/86 |

Primary Examiner—Stephen Marcus
Assistant Examiner—Mark Thronson
Attorney, Agent, or Firm—Cumpston & Shaw

[57] ABSTRACT

A concrete pipe of the type employed, for example, in large sewers is described, having a concrete wall and an inner lining sheet of a polymeric or other plastic material anchored to the wall by a layer of fabric welded or otherwise firmly connected to the sheet. The fabric includes a plurality of preferably monofilament projections having a higher modulus of elasticity than the material of the sheet which projections extend into the inner wall of the concrete pipe and anchor the fabric and sheet thereto. A protective plastic ring and a covering strip positively support the sheet at the joint between two pipes.

13 Claims, 1 Drawing Figure

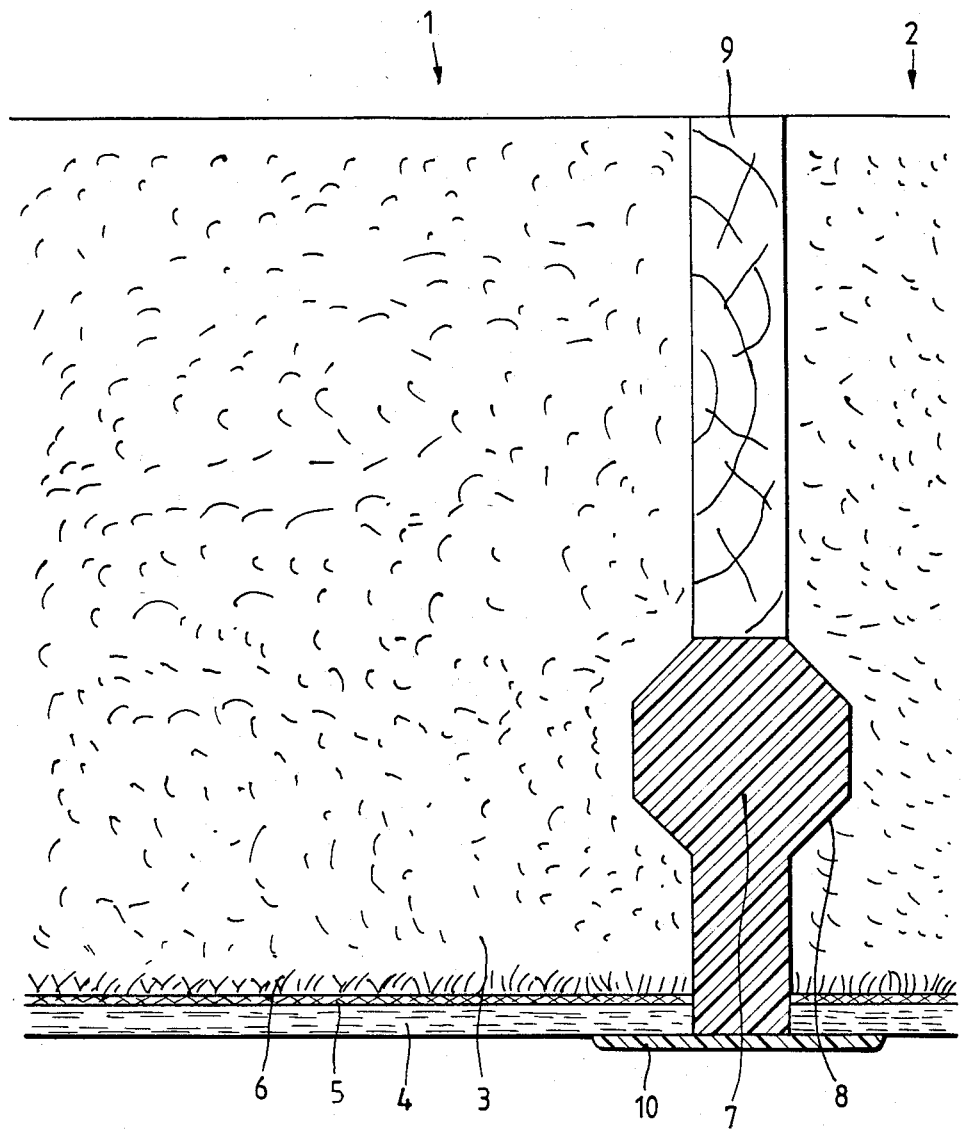

CONCRETE PIPE WITH AN INNER LINING

This application is a continuation, of application Ser. No. 362,077, filed Mar. 26, 1982 now abandoned.

DESCRIPTION

The invention relates to a concrete pipe with an inner lining which is formed by a plastic sheet and which is anchored in the concrete by means of projections arranged close to one another.

It is known to protect concrete pipes from the damaging influence of the media contained in the pipe interior by an inner sheet lining which is anchored in the concrete by means of undercut projections arranged on the sheet. The projections have, for example, the form of battens or knobs of T-shaped cross-section which are arranged at a distance from one another of approximately 5 to 15 cm. It is also known to replace the battens by strips of small projections (German Offenlegungsschrift No. 2,432,648) which are arranged closely to one another in the manner of a brush and which are anchored in a strip of fabric, itself connected to the sheet, the gaps between adjacent strips having a width of 5 to 20 cm. The gaps have hitherto been considered necessary because any excess pressure acting from outside through pores or orifices in the concrete pipe must be given the opportunity to be relieved. In the regions free of anchoring, the pressure medium can lift the sheet off from the surface of the concrete pipe and flow off to a relief point which is located, for example in the case of drainpipes, in the lining-free region of the latter. Under these circumstances, relief ensures that a substantial external excess pressure on the sheet cannot arise. For uses where the external excess pressure on the sheet is not relieved, that is to say for pressure-proof linings, the known forms of anchoring have not proved appropriate. This is not because the anchoring strength of the projections would be insufficient, but because in the regions free of anchoring between adjacent anchoring projections or adjacent strips of small anchoring projections there forms an inwardly directed sheet bulge which is limited sharply at its edge by the anchoring projections or strips, so that a sharp bending edge arises at this point, and, even in the case of a material with high ductility, permanent damage cannot be excluded here.

The object on which the invention is based is, therefore, to provide a concrete pipe of the type mentioned in the introduction, which has an inner sheet lining proof against external pressure.

The solution according to the invention is that over the entire surface of the lining the mean maximum distance between the projections is no greater than three times the sheet thickness, and that the modulus of elasticity of the projections is greater than that of the sheet.

The invention is based on the knowledge that only a combination of these two features will be successful.

It has been shown, in particular, that a surface-covering arrangement of fine projections resembling a brush is not successful by itself. It has been conventional hitherto to make the projections of the same material as the sheet and also to give them the same ductility. As a result, a better compensation of forces between adjacent projections was to be achieved. However, it was shown that, under an external excess pressure, the high ductility of the projections allowed bulging on the sheet, and, in turn, damage could occur at the bulge edges. The edges extending in the longitudinal direction of the pipe were especially endangered, because here the kinking is greater as a result of the added effect of the pipe curvature.

The invention now ensures not only that, as a result of the surface-covering arrangement of the projections, the bulging is much less likely and less pronounced, but, above all, also that the bulging, if it can occur at all, acquires a completely different characteristic. The lower ductility of the projections in conjunction with their arrangement close to one another prevents, in particular, pronounced bulge edges from arising, these being less harmful because, again as a result of the arrangement of the projections close to one another and their lower ductility, a correspondingly higher ductility can be imparted to the sheet material, and as a result of this the danger of stress cracks in the region of the bulge edges is prevented.

Consequently, a decisive factor according to the invention is, in addition to the arrangement of the anchoring projections close to one another, the ratio of the ductility of the projections to that of the sheet.

According to the invention, the danger of damage in the region of the bulge edges can be further reduced by firmly connecting the ductile sheet on its outer side, that is to say on that side on which it would be subjected to tensile stresses in the endangered region, to a tension-proof coating, that is to say a layer with a higher modulus of elasticity. This ensures, in particular, that in the case of inwardly concave bending, such as would occur in the endangered regions, the sheet is predominantly exposed to a compressive stress which, as is known, generally cannot lead to damage when applied continuously.

The invention is explained in more detail below with reference to the drawing which illustrates an advantageous exemplary embodiment in one FIGURE.

This shows a partial longitudinal section through the wall of a concrete pipe, such as is used, for example, for large intercepting sewers, specifically in the region of the joint between two pipe pieces 1 and 2 adjacent to one another axially. The pipes consist of the concrete wall 3 and an inner flexible lining sheet 4 which consists, for example of polyethylene or polypropylene or the like. On its outer side the sheet 4 is connected firmly (for example welded) to a layer of fabric 5 in which the projections 6 are anchored in the manner of a brush. The connection between the fabric layer 5 and the sheet 4 is shear-proof, so that shearing stresses can be transmitted from one layer to the other. The fabric can be provided over the entire surface of the sheet. For the sake of simplicity, it is also possible to use, instead of this, fabric strips which are wound in a peripheral direction or helically so as to be closely adjacent to one another. The fabric advantageously consists of a material with a higher modulus of elasticity than the material of the sheet 4, and it is also necessary to ensure that it is connected to the sheet 4 stretched in such a way that the fabric contains no slack which would permit a certain initial extension without a substantial absorption of stress. In particular, the fabric should have no slack in a peripheral direction, that is to say the threads running in a peripheral direction (generally warp threads) should be essentially stretched, whilst, in the case of the threads running in the axial direction of the pipe (weft threads), a greater change of height corresponding to the alternating flow above and below the warp threads can be permitted. This will ensure that, especially in a peripheral direction, in the case of concave bending of the sheet and of the fabric towards the inside of the pipe the fabric is capable immediately of absorbing tensile stresses before and dangerous tensile stresses can develop in the sheet. In this respect, of course, it is also advantageous if the fabric has such substantial dimensions that it can absorb essentially the entire tensile force and can thereby relieve the sheet, especially in a peripheral direction.

The projections 6 are advantageously monofilaments made of a material which has a somewhat higher modulus of elasticity than the sheet 4. For example, the monofilaments can consist of the same material as the sheet, but they have been given, by prior stretching, a higher modulus of elasticity which is preferably at least twice as high as that of the sheet, preferably approximately four to ten times as high. The fact that the modulus of elasticity of the anchoring projections will be higher than that of the sheet does not mean that the ductility of the projections will be particularly low. As already mentioned, as regards the special load on the sheet at the edges of any bulges, the important factor is, on the contrary, the ratio of the ductility of the projections to that of the sheet.

The monofilaments forming the projections are arranged close to one another. The mean distance between the projections directly adjacent to one another is preferably less than double the sheet thickness, particularly preferably less than one sheet thickness. By the projections directly adjacent to one another are meant those which are next to one another in the same row or which are next to one another in adjacent rows transversely to the direction of the rows. According to the invention, the maximum distance between two adjacent rows of projections will be no greater than double the sheet thickness, preferably no greater than one sheet thickness. By the sheet thickness is meant the thickness of the actual lining sheet 4 plus those layers which participate in absorbing the bending forces in the case of bending of the sheet.

The lining is appropriately already provided at the time of manufacture of the concrete pipe, namely in such a way that the concrete wall 3 is shaped together with the lining maintained in its envisaged form and is allowed to solidify. For example, the lining can be attached to an inner mold core. If it is not already closed in pipe form, its longitudinal gap can be closed, after the pipe has hardened, by applying a welding bead.

The lining is endangered primarily in the region of the joint between two pipe pieces arranged axially behind one another, because at this point the action of external excess pressure is especially strong and the anchoring of the sheet in the concrete is interrupted. According to the invention, therefore, the sheet edge is supported positively in this region by means of a plastic ring 7 which has been appropriately introduced, after the assembly of the pipes 1 and 2, to fill their joint gap, and especially an undercut part 8 of the joint gap, and which extends on the inner side at least up to the inner surface of the lining sheets. Towards the outside, it is limited, during injection, by suitable blocking means which are formed, in the example illustrated, by a piece of wood 9 which is conventionally provided between the end faces of pipe pieces to be pushed forwards in groups within a sewer produced during shield driving. However, it is also possible to use, of course, instead of this piece of wood, any other limiting means which, in the simplest case, are formed by the surrounding earth.

After the plastic ring 7 has solidified, any part of the ring which projects beyond the inner surface of the sheet 4 is trimmed so that it is flush with the sheets. Subsequently, it is possible to attach, likewise by means of a portable extruder, a covering strip 10 which is welded both to the surface of the plastic ring 7 and to the inner surface of the adjacent edges of the sheets 4. As a result, the sheet edges are, on the one hand, retained positively in relation to pressure forces acting from outside and, on the other hand, connected tightly to one another.

If the projections anchored in the concrete are connected to the sheet by means of fabric strips, these strips will be arranged next to one another with as little distance as possible between them, because for weaving reasons the fabric strips cannot accept projections up to their edge, and it is intended to prevent too great a distance between the projections located at their edges from arising because of an unnecessary distance between the strips. For example, in the region where two fabric strips are adjacent to one another, this distance will be no greater than approximately 10 mm in the case of a sheet 3 mm thick.

I claim:

1. In a concrete pipe of the type including an elongated concrete wall having an inner surface and first and second ends, the improvement comprising; an inner lining sheet of flexible polymeric material disposed adjacent said inner surface, said sheet characterized by a first modulus of elasticity; a plurality of monofilamentary projections having one end attached to said lining sheet and the other end extending into said wall, said projections characterized by a modulus of elasticity greater than that of said sheet, and spaced apart a mean distance no greater than approximately three times the thickness of said sheet.

2. The pipe of claim 1 further comprising a layer of stress absorbing material characterized by a modulus of elasticity greater than the modulus of elasticity of said lining sheet, disposed between said lining sheet and said wall and attached firmly to said sheet.

3. The concrete pipe of either of claims 1 or 2 further comprising means for anchoring said lining sheet to said wall at said first and second ends whereby said sheet is held positively in relation to forces acting from outside said wall.

4. The pipe of claims 1 or 2 wherein said sheet comprises a sheet made of a material selected from the group consisting of polyethylene and polypropylene.

5. The pipe of claim 2 wherein said layer of material comprises a layer of fabric.

6. The pipe of claim 5 wherein said fabric is prestretched in at least a peripheral direction so that peripheral stresses on said lining sheet are substantially absorbed by said layer of fabric.

7. The pipe of any of claims 1, 2, 5 or 6 wherein the modulus of elasticity of said projections is between about four and about ten times as high as the modulus of elasticity of said lining sheet.

8. The pipe of claim 1 wherein said projections are spaced apart a mean distance no greater than the thickness of said lining sheet.

9. The pipe of claim 2 wherein said projections are spaced apart a mean distance no greater than the combined thickness of said lining sheet and said layer.

10. The pipe of claim 3 wherein said means for anchoring said sheet comprises a plastic ring attached to said sheet and said wall.

11. The pipe of claim 10 wherein said wall comprises an undercut end portion and wherein said plastic ring engages said undercut end portion and is welded to said sheet.

12. The pipe of claim 3 wherein the modulus of elasticity of said projections is between about four and about ten times as high as the modulus of elasticity of said lining sheet.

13. The pipe of claim 6 wherein the modulus of elasticity of said projections is between about four and about ten times as high as the modulus of elasticity of said lining sheet.

* * * * *